Figure 1:
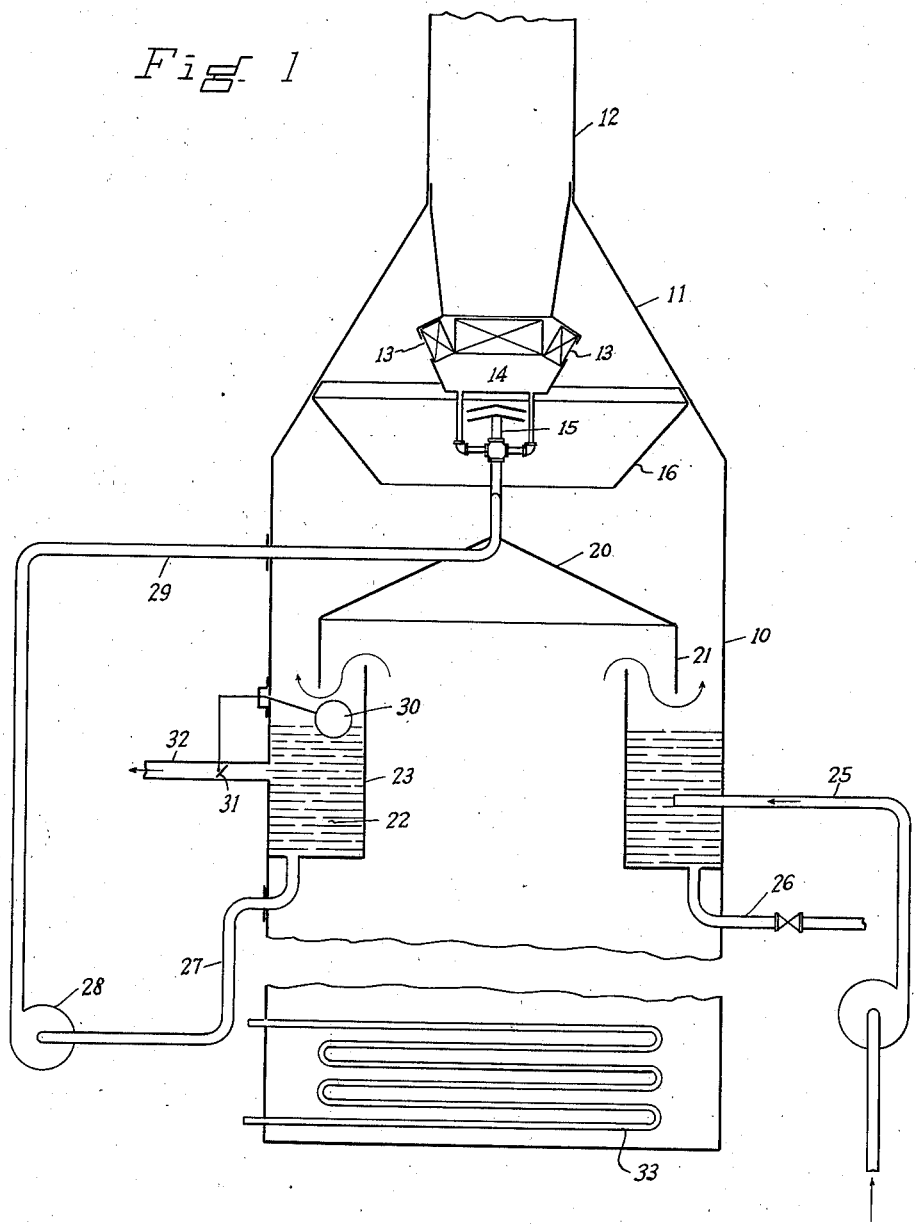

Dec. 28, 1937.　　　E. L. LULY　　　2,103,521
EVAPORATOR
Filed Oct. 30, 1936　　2 Sheets-Sheet 1

INVENTOR.
Edgar L. Luly
BY
ATTORNEY.

Dec. 28, 1937. E. L. LULY 2,103,521
EVAPORATOR
Filed Oct. 30, 1936 2 Sheets-Sheet 2

INVENTOR.
Edgar L. Luly
BY
ATTORNEY.

Patented Dec. 28, 1937

2,103,521

UNITED STATES PATENT OFFICE 2,103,521

EVAPORATOR

Edgar Lionel Luly, London, England, assignor to The Babcock & Wilcox Company, Newark, N. J., a corporation of New Jersey Application October 30, 1936, Serial No. 108,341
In Great Britain September 3, 1935

6 Claims. (Cl. 159—31)

This invention relates in general to the construction and operation of vapor generating apparatus. While my invention is particularly applicable to evaporators used for concentrating liquors, such as chemical solutions, it is also applicable to evaporators for boiler feed water.

As generally used in concentrating chemical solutions, such evaporators have the disadvantage that a certain proportion of the chemical contents of the liquor is carried up by the saturated or superheated vapor arising from the boiling liquor into the vapor pipework with a consequent loss of chemicals, and in multiple effect evaporators, a loss in heat transfer efficiency and loss of time due to stoppage for cleaning.

These disadvantages may be overcome by the provision in the upper portion of the evaporator of a spray of suitable washing liquid directed across the path of the uprising vapor so that certain constituents thereof will be removed by a washing action prior to the passage of the vapor to the outlet. If desired a liquid separating device may also be provided above the liquor spray and prior to the outlet.

In dealing with chemical solutions, however, it is highly desirable that the washing liquid be prevented from mixing or coming into contact with the main body of liquor under treatment. A main object of my invention is to provide an evaporator construction and arrangement in which such mixing or contacting of the washing liquid with the liquor under treatment is prevented.

Figure 2:
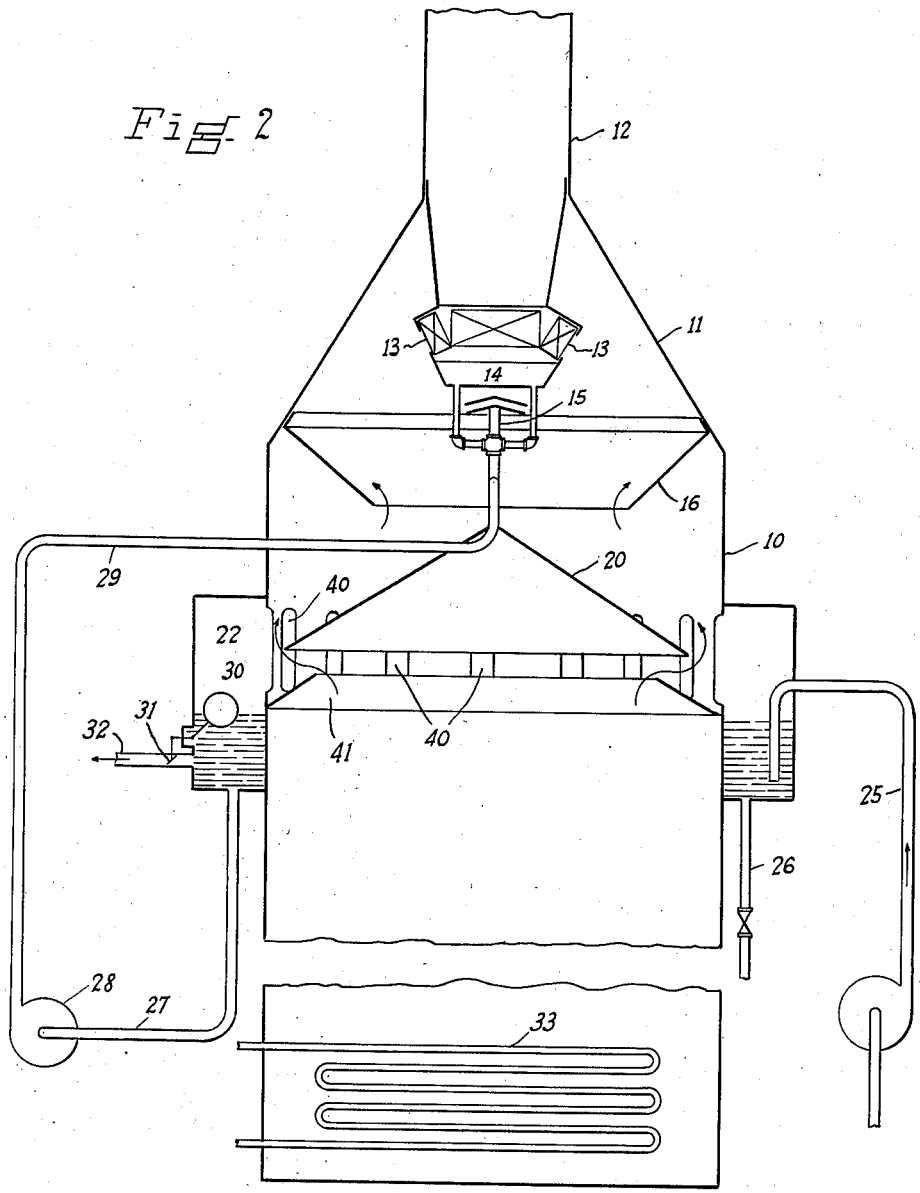

In the drawings:

Fig. 1 is a somewhat diagrammatic sectional elevation of an evaporator incorporating my invention; and Fig. 2 is a similar view of a modification.

The evaporator shown in Fig. 1 is formed by a vertically elongated cylindrical casing 10 adapted to contain a body of chemical liquid in the bottom thereof and having a tapered top section 11 through which extends a central vapor outlet pipe 12 tapering towards its open lower end. At the lower end of the pipe 12 and discharging thereto is arranged a gas and liquid separator of the type disclosed in a prior application of James Fletcher et al., Serial No. 7,188, filed Feb. 19, 1935, having corrugated plate separator sections 13 in a cruciform arrangement. The separator sections have a common drain chamber 14 which is drained by an aspirating sprayer head 15, also of the type shown in said application, arranged coaxially with said casing. An inverted frusto-conical baffle 16 arranged coaxially with the sprayer head extends downwardly from the casing top section 11 to a level below the sprayer head level.

With the described arrangement wet vapor liberated from the body of liquid in the bottom by any suitable heating means would ascend and pass around the lower end of the baffle 16 to the zone of activity of the sprayer head 15. A suitable washing liquid is supplied to the sprayer head as hereinafter described and discharged in a spray through which the ascending vapor must pass to reach the separator sections 13. Particles of liquid and solids in suspension are separated from the gases and added to the washing liquor, while the dry and clean vapor passes out through the pipe 12. Where a mixture of vapors is generated, some of the vapors can be removed by using a suitable absorbing washing liquid.

In accordance with my invention the desired results are attained by providing at a suitable position between the surface of the body of chemical liquor and the sprayer head 15, a distributor cone 20 of suitable diameter and of a material capable of withstanding the corrosive properties, if any, of the liquor and/or vapor contacting therewith. The distributor is bounded at its lowest extremity by a relatively short depending hollow cylinder or skirt 21 which may be solid or perforated. The skirt 21 depends into the upper portion of an annular collecting chamber 22 shown as formed within the evaporator casing by a symmetrically arranged annular L-shaped plate 23 secured to the casing 10.

The collecting chamber 22 is provided with a make-up supply connection 25 and a blow-down connection 26 which may deliver to waste, a recovery tank or a preheater for the make-up. The sprayer head 15 receives its liquid supply from the collecting chamber through a pipe 27 opening to the bottom of the chamber, a circulating pump 28, and pipe 29. A float 30 is arranged in the collecting chamber to control a valve 31 located in an overflow pipe 32 discharging to waste, a recovery tank or a preheater for the make-up, and limit the maximum liquid level in the chamber. A heating coil 33 is conventionally shown in the lower part of the evaporator to provide means for vaporizing the surrounding liquid.

In operation the vapors generated in the bottom of the evaporator ascend in the casing, flow over the upper end of the baffle 23 and below the distributor cone skirt 22 to the upper part of the casing. The direction of the vapor flow is again changed by the baffle 16 before the vapor reaches the separator sections 13. The washing liquid is drawn from the collecting chamber by the pump 28 and delivered to the spraying device 15. The spray discharged is such that the rising vapor will be compelled to pass through it on its way to the separating sections 13 and outlet pipe 12. With the casing 10 of circular cross-section, a finely divided conical spray is preferable. The falling spray descends onto the subjacent distributor cone 20, and flows over the lower edge thereof and down the depending skirt 21, and so into the collecting chamber, the cycle thereupon recommencing. The vapors rising from the surface of the pool of chemical solution are thus constrained to pass successively through a plurality of washing liquid curtains formed by the spray falling from the spraying head and by the spray falling from the distributor cone. The rising vapors thus pass through a progressively "cleaner" washing liquid so that the final washing is effected by liquid which is at the lowest concentration. In other words the system may be stated to work on the contraflow principle in that the vapor most heavily charged with chemicals will contact with the washing liquid when it is at its greatest concentration.

Make-up washing liquid is supplied to the collecting chamber to compensate for that discharged through the overflow pipe 32 and the blow-down connection 26, the blow-down provisions being essential to limit the concentration of the washing liquid in the collecting chamber. A certain amount of condensation of vapor will take place, thus reducing the amount of make-up to be added. Both the overflow and the blow-down liquid may thus be utilized for preheating the make-up washing liquid and then if desired the chemical contents thereof may be recovered by suitable means.

In the modification shown in Fig. 2 the annular collecting chamber is shown as located around the external periphery of the casing 10 instead of within the casing, as shown in Fig. 1. In the Fig. 2 construction, the collecting chamber is closed at both its lower and upper ends, and communicates with the interior of the evaporator at its inner side through vertically elongated slots 40 formed in that section of the casing 10. The skirt of the distributor cone is omitted in this construction and a frusto-conical baffle 41 arranged at the lower ends of the slots 40 coaxial with the cone and its upper end smaller than the lower periphery of the cone 20, to provide a sinuous flow path for the ascending vapor and facilitate the passage of the washing liquid through the casing slots 40 into the external collecting chamber 22. The operation is otherwise similar to that in Fig. 1.

Both evaporator constructions described effectively prevent mixing of the washing liquid with the main body of liquid in the evaporator, while permitting an intimate and efficient washing of the vapor generated.

While in accordance with the provisions of the statutes I have illustrated and described herein the best forms of my invention now known to me, those skilled in the art will understand that changes may be made in the form of the apparatus disclosed without departing from the spirit of the invention covered by my claims, and that certain features of my invention may sometimes be used to advantage without a corresponding use of other features.

I claim:

1. An evaporator having a cylindrical casing constructed to contain a pool of vaporizable liquid in the lower part thereof and having a vapor outlet from the upper part thereof, a sprayer head above said pool arranged to downwardly discharge a conical liquid spray in said casing, a distributor cone symmetrically arranged relative to and below said sprayer head and having its lower end spaced from the sides of said casing for the passage of ascending vapor, a separate annular collection chamber arranged to receive and collect liquid dropping from said distributor cone, means for delivering liquid from said collecting chamber to said sprayer head, a blow-down connection for said collecting chamber, and means for supplying make-up liquid directly to said collecting chamber.

2. An evaporator having a cylindrical casing constructed to contain a pool of vaporizable liquid in the lower part thereof and having a vapor outlet from the upper part thereof, a gas and liquid separator in said casing opening to said outlet, a sprayer head below said separator arranged to downwardly discharge a conical liquid spray in said casing, a distributor cone symmetrically arranged relative to and below said sprayer head and having its lower end spaced from the sides of said casing for the passage of ascending vapor, a separate annular collection chamber arranged to receive and collect liquid dropping from said distributor cone, means for delivering liquid from said collecting chamber to said sprayer head, and liquid level control means in said collecting chamber.

3. An evaporator having a cylindrical casing constructed to contain a pool of vaporizable liquid in the lower part thereof and having a vapor outlet pipe projecting downwardly within the upper part thereof, a gas and liquid separator in said casing opening to said outlet, a sprayer head below said separator arranged to downwardly discharge a conical liquid spray in said casing, an inverted frusto-conical baffle surrounding said sprayer head at the sides of said casing, a distributor cone symmetrically arranged relative to and below said sprayer head and having its lower end spaced from the sides of said casing for the passage of ascending vapor, a separate annular collection chamber arranged to receive and collect liquid dropping from said distributor cone, and means for delivering liquid from said collecting chamber to said sprayer head.

4. An evaporator having a cylindrical casing constructed to contain a pool of vaporizable liquid in the lower part thereof and having a vapor outlet pipe projecting downwardly within the upper part thereof, a gas and liquid separator in said casing opening to said outlet, a sprayer head below said separator arranged to downwardly discharge a conical liquid spray in said casing, an inverted frusto-conical baffle surrounding said sprayer head at the sides of said casing, a distributor cone symmetrically arranged relative to and below said sprayer head and having its lower end spaced from the sides of said casing for the passage of ascending vapor, a separate annular collection chamber arranged to receive and collect liquid dropping from said distributor cone, means for delivering liquid from said collecting chamber to said sprayer head, liquid level control means in said collecting chamber, a blow-down connection for said collecting chamber, and means for supplying make-up liquid directly to said collecting chamber.

5. An evaporator having a cylindrical casing constructed to contain a pool of vaporizable liquid in the lower part thereof and having a vapor outlet in the upper part thereof, a gas and liquid separator in said casing opening to said outlet, a sprayer head below said separator arranged to downwardly discharge a conical liquid spray in said casing, a distributor cone symmetrically arranged relative to and below said sprayer head and having its lower end spaced from the sides of said casing for the passage therebetween of ascending vapor, and a separate annular collection chamber arranged to receive and collect liquid dropping from said distributor cone.

6. An evaporator having a cylindrical casing constructed to contain a pool of vaporizable liquid in the lower part thereof and having a vapor outlet in the upper part thereof, a gas and liquid separator in said casing opening to said outlet, a sprayer head below said separator arranged to downwardly discharge a conical liquid spray in said casing, an inverted frusto-conical baffle surrounding said sprayer head at the sides of said casing, a distributor cone symmetrically arranged relative to and below said sprayer head and having its lower end spaced from the sides of said casing for the passage therebetween of ascending vapor, and a separate annular collection chamber arranged to receive and collect liquid dropping from said distributor cone.

EDGAR LIONEL LULY.